(12) United States Patent
Ananian

(10) Patent No.: US 6,431,634 B1
(45) Date of Patent: Aug. 13, 2002

(54) COLLAPSIBLE TRUCK SHELL ASSEMBLY AND ACCESSORIES

(76) Inventor: Frederick Ananian, 27102 Hidden Trail Rd., Laguna Hills, CA (US) 92653

( * ) Notice: Subject to any disclaimer, the term of this patent is extended or adjusted under 35 U.S.C. 154(b) by 0 days.

(21) Appl. No.: 09/761,405

(22) Filed: Jan. 16, 2001

(51) Int. Cl.[7] .................................................. B60P 7/02
(52) U.S. Cl. ........................... 296/100.12; 296/100.05; 296/100.12; 296/100.11; 296/105
(58) Field of Search ....................... 296/100.12, 100.18, 296/165, 164, 105, 326; 160/84.01

(56) References Cited

U.S. PATENT DOCUMENTS

| | | | |
|---|---|---|---|
| 3,688,787 A | 9/1972 | Feather | |
| 3,901,548 A | 8/1975 | Seaman, Jr. | |
| 4,252,363 A | * 2/1981 | Rodrigue | 160/84.01 |
| 4,289,346 A | * 9/1981 | Bourqeois | 296/100.05 |
| 4,342,480 A | * 8/1982 | Ross, Jr. | 296/100.12 |
| 4,709,956 A | * 12/1987 | Bowman | 296/100 |
| 4,721,336 A | * 1/1988 | Jones | 135/129 |
| 4,784,429 A | * 11/1988 | Hodges | 160/202 |
| 4,789,196 A | * 12/1988 | Fields | 296/100.04 |
| 4,883,305 A | * 11/1989 | Horton | 296/105 |
| 4,938,523 A | * 7/1990 | Camp | 296/105 |
| 5,005,896 A | 4/1991 | Li | |
| 5,056,855 A | 10/1991 | Moravsky | |
| 5,139,375 A | 8/1992 | Franchuk | |
| 5,186,513 A | 2/1993 | Strother | |
| 5,203,603 A | * 4/1993 | Hertzberg et al. | 296/100.03 |
| 5,238,288 A | * 8/1993 | Chandler | 296/100 |
| 5,338,084 A | * 8/1994 | Wardell | 296/100.12 |
| 5,385,377 A | 1/1995 | Girard | |
| 5,443,295 A | * 8/1995 | Moberly | 160/180 |
| 5,524,953 A | * 6/1996 | Shaer | 296/100.12 |
| 5,531,497 A | * 7/1996 | Cheng | 296/100.01 |
| 5,556,156 A | 9/1996 | Kirk | |
| 5,752,736 A | 5/1998 | Nodier | |
| 5,769,482 A | * 6/1998 | Kirk | 296/100.11 |
| 5,803,529 A | 9/1998 | Perry-Bores | |
| 5,845,957 A | * 12/1998 | Hurst | 135/88.09 |
| 6,000,745 A | * 12/1999 | Alexa | 296/100.11 |

* cited by examiner

*Primary Examiner*—Stephen T. Gordon
*Assistant Examiner*—Kiran B. Patel
(74) *Attorney, Agent, or Firm*—Stetina Brunda Garred & Brucker

(57) ABSTRACT

A collapsible truck shell assembly for use with a truck bed having a first bed wall and a second bed wall. The shell assembly is movable between an extended position and a collapsed position, and includes a pair of elongate tracks mounted to the sides of the truck bed and configured to support a plurality of generally U-shaped frame members. A covering is attachable to and extensible between the frame members and substantially encloses the truck bed when the truck shell assembly is in the extended position. The frame members may be of progressively decreasing sizes so as to be nestable within each other and assume a generally planar configuration when the truck shell assembly is in the collapsed position. The frame members may be mounted to the elongate tracks in a manner which allows the frame members to be adjusted horizontally. Additionally, a storage box and storage rack are configured to be slidably engageable to the tracks mounted to the sides of the truck bed.

8 Claims, 8 Drawing Sheets

COLLAPSIBLE TRUCK SHELL ASSEMBLY AND ACCESSORIES

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to truck bed accessories and more particularly to a collapsible truck shell and line of accessories that are configured to be mountable upon a set of truck bed rails.

The bed of a truck can be covered with a hard shell to protect the contents contained therein. Typically, the shell is mounted to the rails of the truck bed with threaded fasteners thereby hindering easy removal. Often times, the shell must be removed when storing objects that cannot fit within truck bed and/or shell. However, since the shell is mounted to the rails with threaded fasteners, tools must be used to remove the shell and it can be time consuming to remove each fastener. Additionally, once the shell has been removed from the truck bed, it needs to be stored. Often times, during deliveries, the truck shell must be removed in order to place large objects in the truck bed. However, the truck may be in a location where there is no secure place to store the shell.

Prior art rigid truck shells have been made with quick release mechanisms (for example, brackets, latches and slides to mount the shell to the rails of the truck bed).

In one embodiment of the prior art, tracks are mounted upon the rails of the truck bed, and the rigid shell is attached to the tracks. Therefore, the shell is removed from the truck bed by sliding the shell off of the tracks. Such mechanisms facilitate the easy removal of the shell, but do not solve the problem of storing the rigid shell.

In order to alleviate the problem of storing a truck shell, prior art truck shells have been made out of canvas. In such a system, the shell is a canvas covering secured to a series of posts secured to the truck bed. The canvas is removable from the posts such that it can be folded and stored in the truck bed. Additionally, the posts are removable from the truck bed rails, such that they may be storable within the bed. Even though the posts and canvas are removable, they still take up valuable space within the truck bed when removed from the truck bed rails.

Additionally, other accessories are mounted to the truck bed. Racks and storage boxes are mounted to the truck bed to provide added and secure storage. Typically, the racks and storage boxes are mounted to the truck bed with threaded fasteners. However, such attachment method do not allow quick and easy removal of such accessories.

The present invention addresses the above-mentioned deficiencies in the prior art truck shells by providing a truck shell that is easily collapsible on the truck bed. The truck shell of the present invention is easily folded into a compact configuration that does not impinge on the space within the truck bed. Additionally, the attachment method of a truck shell constructed in accordance with the present invention may be used for mounting other items to the truck bed.

BRIEF SUMMARY OF THE INVENTION

In accordance with the present invention there is provided a collapsible truck shell assembly for use with a truck bed having a first bed wall and a second bed wall that bound the interior of the truck bed. The shell assembly is movable between a collapsed and an extended position and comprises an elongate first track mounted to the first bed wall and an elongate second track mounted to the second bed wall. The shell assembly further comprises a plurality of generally U-shaped frame members slidably engagable to and extensible between the first and second tracks. Additionally, the shell assembly includes a collapsible covering attached to and extensible between the frame members. The covering is sized to substantially enclose the truck bed when the shell assembly is in the extended position.

The frame members may be sized in a progressively decreasing fashion such that each frame member is nestable within a preceding frame member. In this respect, when the shell assembly is in the collapsed position, the frame members assume a generally planar configuration. The frame members may be mounted on brackets which allow for horizontal adjustment of the frame members.

In order to attach the frame members to the tracks, the truck bed assembly includes a plurality of brackets. Each of the brackets is attachable to the bottom ends of a respective frame member and is configured to be slidable within a channel formed in the first and second track. Each of the frame members include a horizontal top portion and a first and second vertical side portion. The horizontal top portion and the vertical side portions may be sized slightly smaller than a preceding frame member such that the frame member is nestable within a preceding larger frame member. Additionally, first and second vertical side portions of each frame member may be formed with a series of bends in order to facilitate nesting of the frame member within a preceding larger frame member.

In order to maintain each frame member at a prescribed location, each track contains multiple pairs of coaxially aligned apertures extending through the track. A pin is insertable through at least one pair of aligned apertures and into the bracket and/or frame member in order to lock the frame member to the track. The truck shell assembly is configured to be collapsible at a front of the truck bed when the pins are removed from the tracks and the frame members are slid toward the front of the truck bed.

In addition to attaching the truck shell assembly to the bed, a storage box may also be installed. The storage box comprises a compartment that is slidably engageable to and extensible between the first and second tracks. The storage box may be locked into place with the locking pins and series of aligned apertures discussed above. Additionally, the storage box may be slidably engageable to the first and second tracks through the use of two brackets attached to opposite sides of the storage box.

A storage rack may also be attached to the first and second tracks mounted to the truck bed walls. The storage rack comprises a generally square top member having four corners and at least four vertical support members. Each of the top ends of the vertical support members are attached to a respective one of the corners. The bottom ends of the vertical support members are slidably engageable to one of the tracks. Specifically, two of the vertical support members are slidably engagable to the first track and the other two vertical support members are slidably engagable to the second track.

BRIEF DESCRIPTION OF THE DRAWINGS

These as well as other features of the present invention, will become more apparent upon reference to the drawings wherein.

DETAILED DESCRIPTION OF THE INVENTION

Figure 1:
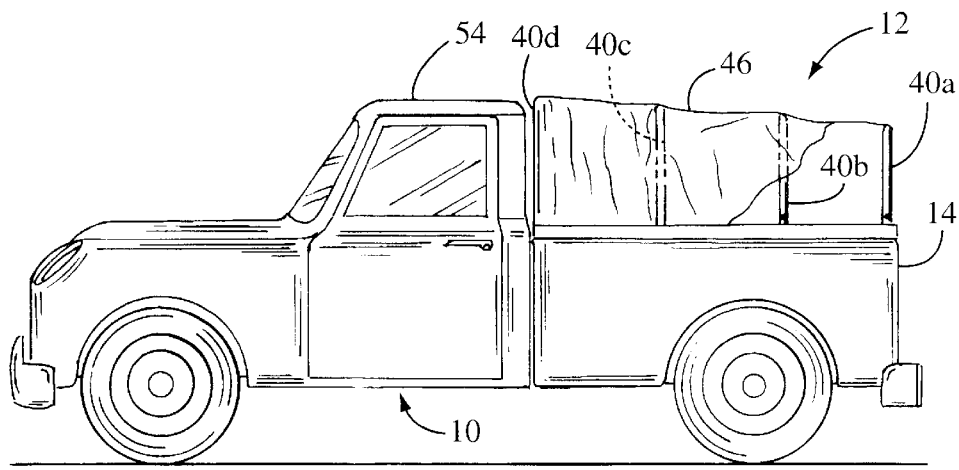
FIG. 1 is a side elevational view of an exemplary collapsible truck shell assembly formed in accordance with the present invention as mounted to a truck and disposed in its extended position.
Figure 3:
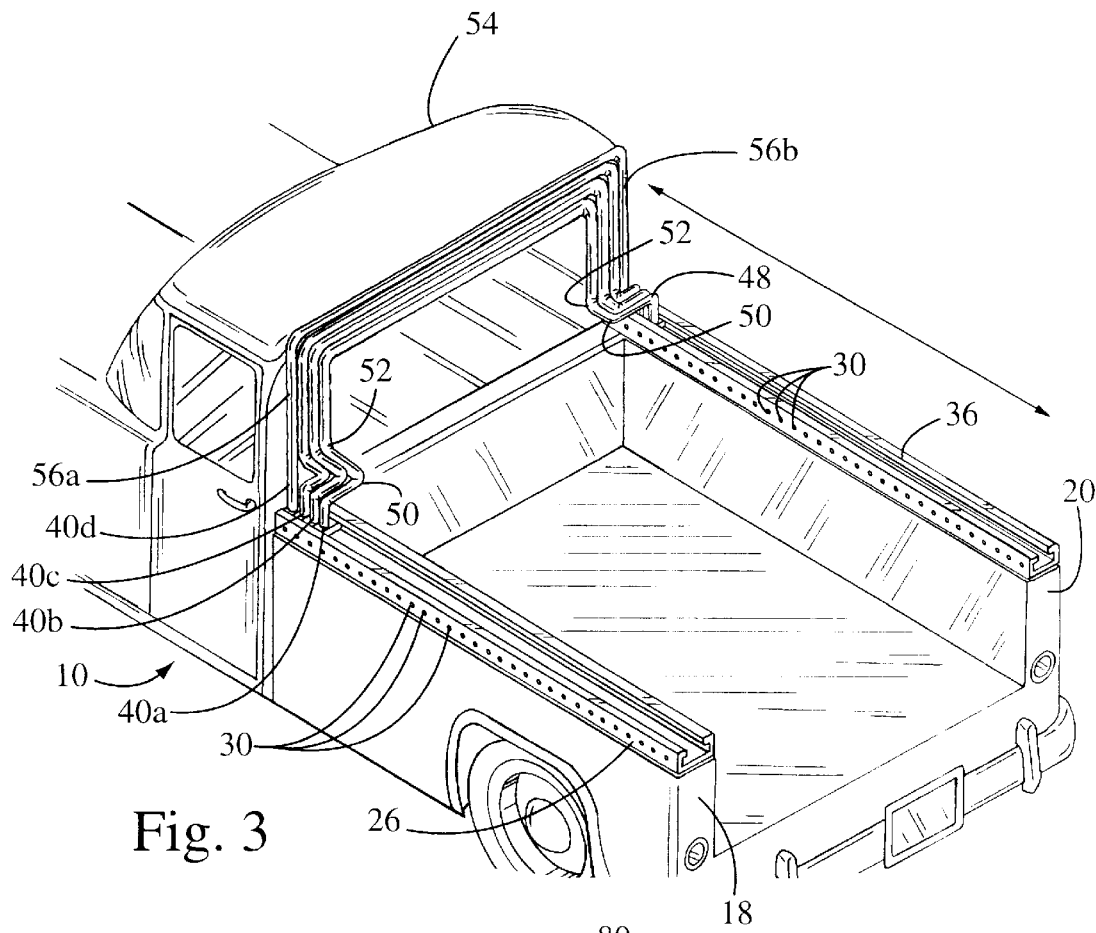
FIG. 3 is a top perspective view of the track and support frame members for the truck shell assembly shown in FIG. 1, illustrating the support frame members in a collapsed position.
Figure 9:
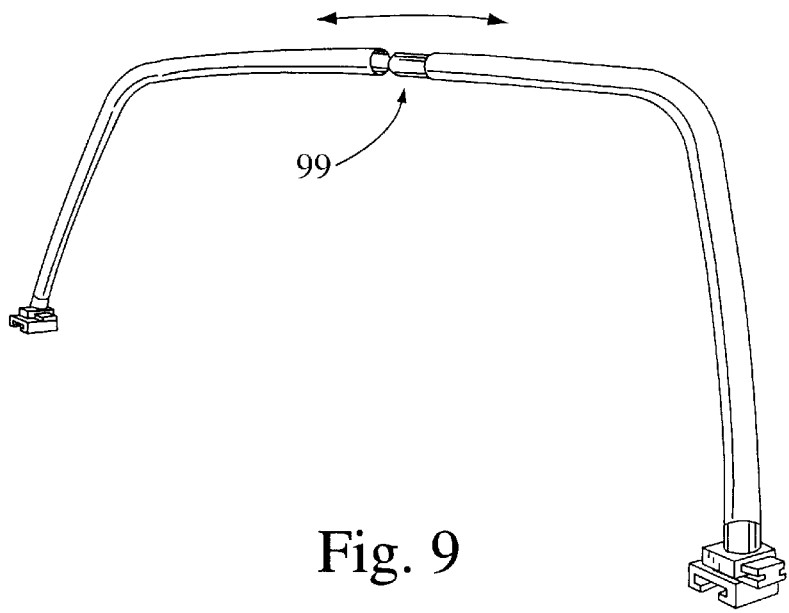
FIG. 9 is an exploded view of an extendible frame member of the truck shell assembly shown in FIGS. 4–6.
Figure 11:
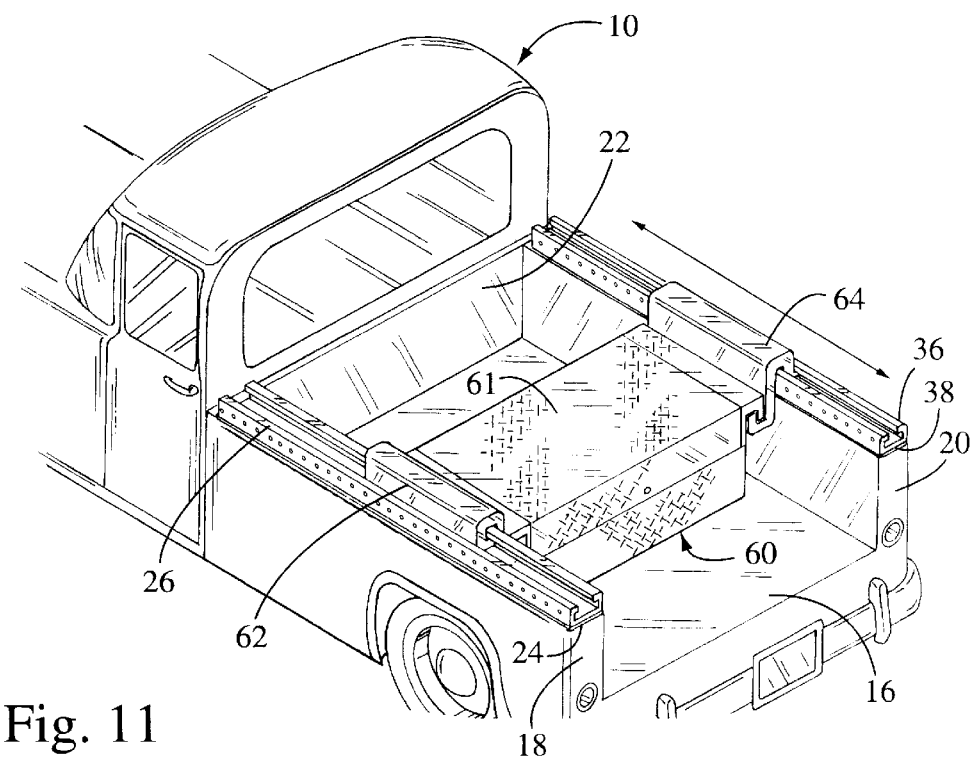
FIG. 11 is a top perspective view of a third embodiment of the present invention illustrating a storage box as mounted to a truck through the use of the tracks of the truck shell assembly of the first embodiment.

Referring now to the drawings wherein the showings are for purposes of illustrating preferred embodiments of the present invention only, and not for purposes of limiting the same, FIG. 1 is a side elevational view of a truck 10 with a collapsible truck shell 12 attached to a truck bed 14. Referring to FIGS. 3, 9 and 11, the truck bed 14 comprises a bed floor 16 surrounded by an upwardly projecting left bed wall 18, an upwardly projecting right bed wall 20, and an upwardly projecting forward bed wall 22. The left bed wall 18 and the right bed wall 20 extend in substantially parallel, spaced relation to one another along opposite sides of the truck 10. A forward edge of each left and right bed wall 18 and 20 is attached to the side edges of the forward bed wall 22. Additionally, a tail gate (not shown) may be disposed between the rear edges of each bed wall 18 and 20. The bed floor 16, left bed wall 18, right bed wall 20, and forward bed wall 22 collectively define an interior of truck bed 14.

Figure 2:
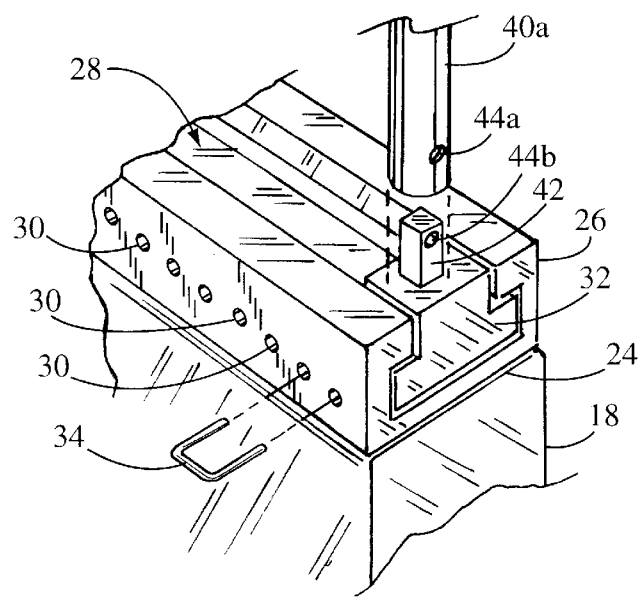
FIG. 2 is a partial top perspective view of the track, bracket and support frame members of the truck shell assembly shown in FIG. 1.

Referring to FIG. 2, the left bed wall 18 has a top surface or left rail 24 that extends longitudinally along the length of the truck bed 14. Attached to the left rail 24 is a left track 26 that extends along the length of the left rail 24 and therefore the truck bed 14. The left track 26 is an elongate section of metallic material with a generally T-shaped channel 28 formed within the interior thereof. Additionally, disposed within the left track 26 are a plurality of coaxially aligned pairs of apertures 30. The apertures 30 of each pair extend through respective sides of the track 26. The channel 28 of the left track 26 is formed to slidably receive a bracket 32. Specifically, bracket 32 is T-shaped and sized slightly smaller than channel 28 such that bracket 32 is slidably insertable and movable therein. Since both the channel 28 and the bracket 32 are T-shaped, the bracket 32 is slidable along the length of track 26, but will not be removable upwardly from the T-shaped channel 28. Each bracket 32 is locked into a prescribed position along the length of the left track 26 with a U-shaped pin 34. The pin 34 is advancable through two adjacent apertures 30 and into the bracket 32 that has a corresponding set of apertures (not shown) to lock the bracket 32 into a desired position along the length of left track 26. In the exemplary embodiment of the present invention, a right track 36 is attached to a top surface or right rail 38 of right bed wall 23. The right track 36 is identically configured to the left track 26 and as such comprises a channel 28 and a plurality of coaxially aligned sets of apertures 30 extending through the sides thereof. As such, bracket 32 is also insertable into the channel 28 and maintained in position along the length of right track 36 with a U-shaped pin 34. As will be recognized, the brackets 32 may contain bearings to facilitate sliding within the channel 28 of the tracks 26 and 36.

In the exemplary embodiment of the present invention shown in FIGS. 1 and 2, each track 26 and 36 receives a plurality of brackets 32 to support the collapsible truck shell 12. In this respect, bracket 32 is configured to support a bottom end of a frame member 40a with a post 42. As seen in FIG. 2, the post 42 may be integrally formed on bracket 32 and extend upwardly therefrom. The post 42 is slightly smaller than the inside diameter of frame member 40a such that frame member 40a is slidably advancable thereover. The frame member 40a contains an aperture 44a that is alignable with an aperture 44b formed on the post 42. A pin or bolt is thereby advancable through both apertures 44a and 44b when frame member 40a is fully advanced over the post 42 such that the frame member 40a is locked into position thereon.

As seen in FIG. 1, the frame member 40a, as well as frame members 40b, 40c, and 40d are used to support a covering 46 (e.g., cloth, nylon or canvas) that is configured to enclose the truck bed 14. While the exemplary embodiment uses a configuration of four frame members 40a, 40b, 40c and 40d, it will be appreciated that different configurations may be used. The frame members 40a–d are U-shaped tubular support frames that the covering 46 is attachable to and extensible between. In the first embodiment of the present invention, the frame members 40a, 40b, 40c, and 40d are similarly configured in that opposite bottom ends of each frame member 40a–40d are attachable to a respective one of the brackets 32. Specifically, the bottom end of each frame member 40b–40d is advancable over post 42 of a respective bracket 32 and maintained in position with a pin or bolt through apertures 44a and 44b as previously described for frame member 40a.

The frame members 40a–40d are sized such that the frame members 40a–40d nest within each other into a generally planar, collapsed position when the frame members 40a–40c are advanced toward the forward end of the truck bed 14, as seen in FIG. 3. The frame members 40a–40d are formed into a generally U-shaped configuration from metallic tubing and have two opposite, vertical side portions 56a and 56b and a horizontal top portion 58 that supports the covering 46 above the truck bed 14. Each frame member 40a–40d is sized slightly larger than a preceding frame member 40a–40d. Specifically, frame member 40d is the largest, such that adjacent frame member 40c is nestable within frame member 40d when advanced toward the forward bed wall 22 of truck bed 14. Similarly, frame member 40c is larger than frame member 40b such that frame member 40b can nest within frame member 40c when slid forward on truck bed 14. Finally, frame member 40a is the smallest frame member and will nest within frame member 40c. Therefore, frame members 40a–40d are of progressively increasing sizes so as to be nestable within each other and to assume a generally planar configuration when in the collapsed position. In order to allow nesting of frame members 40a–40d, the side portions 56a, 56b and top portion 58 of each frame member 40a–40d is sized slightly larger than a preceding frame member 40a–40d. Additionally, each frame member 40a–40c is formed with three bends that allow the frame members to nest within each other, yet still allow the frame members 40a–40c to remain attached to the left track 26 and right track 36. The first bend 48 angles each frame member 40a–40c inward toward the truck bed 14, the second bend 50 angles each frame member 40a–40c toward the front bed wall 20 and the third bend 52 angles each frame member 40a–40c upward to assume its U-shaped configuration. The bends 48, 50, and 52 are formed on each side portion 56a, 56b of frame members 40a–40c near the attachment points with brackets 30. As seen in FIG. 3, the bends 48, 50, and 52 allow the top 58 and side 56a, 56b portions of each frame member 40a–40c to nest within each other such that the frame members 40a–40c are flush against the cab 54 of truck 10 when slid forward on tracks 26 and 36. The largest frame member 40d does not need bends 48, 50, and 52 since all of the other frame members 40a–40c nest within frame member 40d.

As will be recognized by those of ordinary skill in the art, the frame members 40a–40d may be nestable within each other through other means. The brackets 32 may be configured to allow the frame members 40a–40d to nest within each other without the use of bends 48, 50, and 52. Alternatively, the frame members 40a–40d may be formed from a flexible material that can support the covering 46, yet be moved into a position whereby the frame members 40a–40d are nested within each other when slid toward cab 54.

FIG. 3 depicts the frame members 40a–40d nested into a collapsed position without covering 46 for clarity. However, it is possible to nest frame members 40a–40d with the covering 46 attached to each frame member 40a–40d such that the covering 46 drapes over the nested frame members. As will be recognized, the frame members 40a–40d can be maintained in the nested position by using pin 34 to lock the brackets 32 to a respective rail 26, 36. By nesting the frame members 40a–40d toward the front of the cab, valuable space within the truck bed 14 is now usable for a variety of purposes. The truck shell 12, in the collapsed position, allows full use of the truck bed 14 without the inconvenience of finding storage space for the shell 12. Additionally, since the frame members 40a–40d slide on tracks 26 and 36, the truck shell 12 is quickly and easily collapsed by removing the locking pins 34 and sliding the brackets 32 with respective frame members 40a–40d toward the cab 54.

Figure 4:
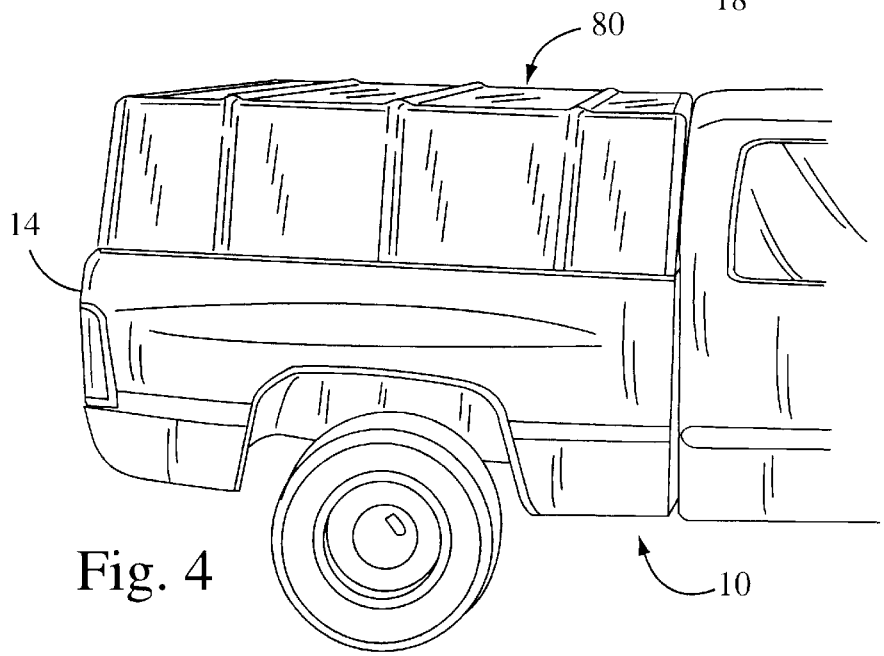
FIG. 4 is a side elevational view of a second embodiment of a collapsible truck shell formed in accordance with the present invention as mounted to a truck and disposed in its extended position with the covering.
Figure 5:
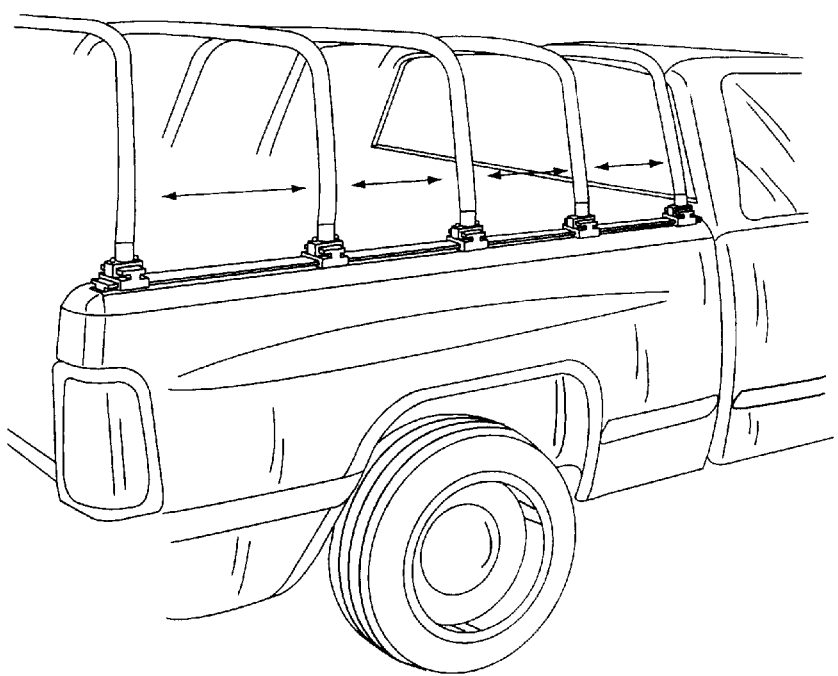
FIG. 5 is a side perspective view of the second embodiment of the collapsible truck shell shown in Figure as mounted to a truck and disposed in its extended position without the covering.

FIGS. 4–10 illustrate an alternate embodiment of a collapsible truck shell 80 in which FIG. 4 is a side elevational view of a truck 10 with a collapsible truck shell 80 attached to a truck bed 14. The alternate embodiment shown in FIG. 4 is similar to the collapsible truck shell shown in FIGS. 1–3 with the following differences: the frame members do not nest within each other; and the bracket mountings are slidable so that the shell assembly can be adjusted horizontally enabling it to be used on trucks whose side walls are not parallel.

Figure 6:
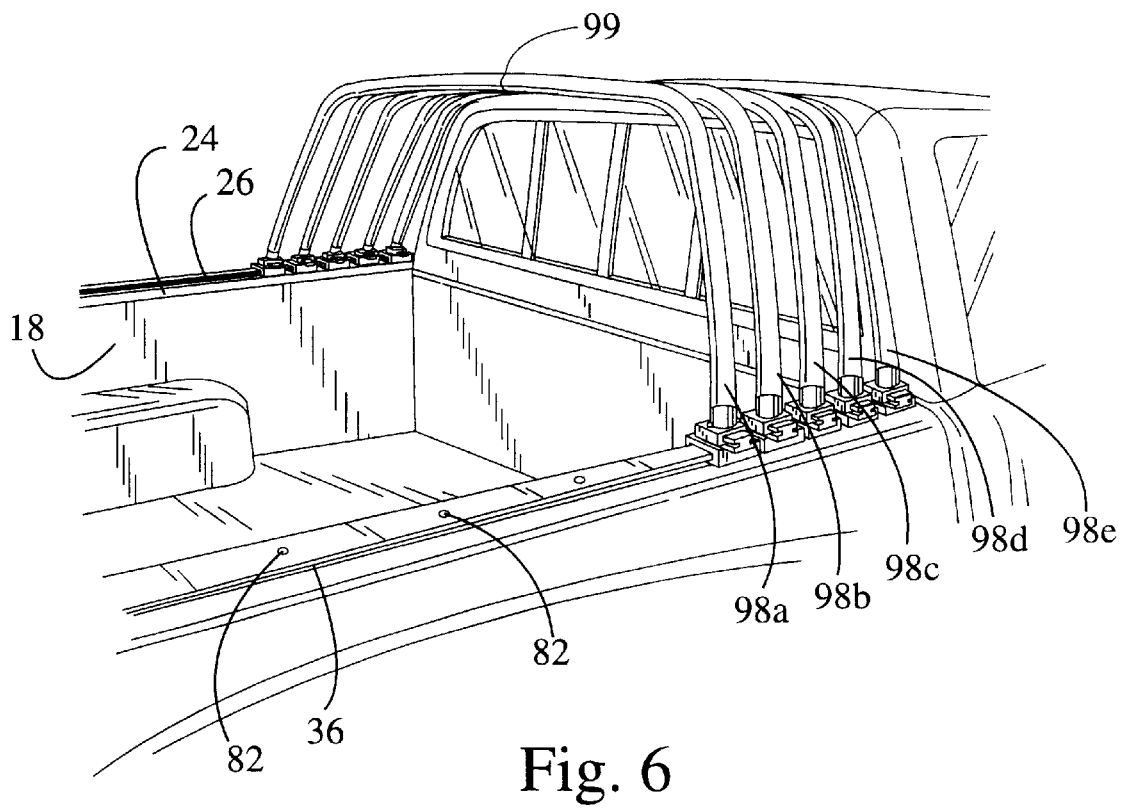
FIG. 6 is a side perspective view of the collapsible truck shell assembly shown in FIG. 5 in its collapsed configuration.
Figure 7:
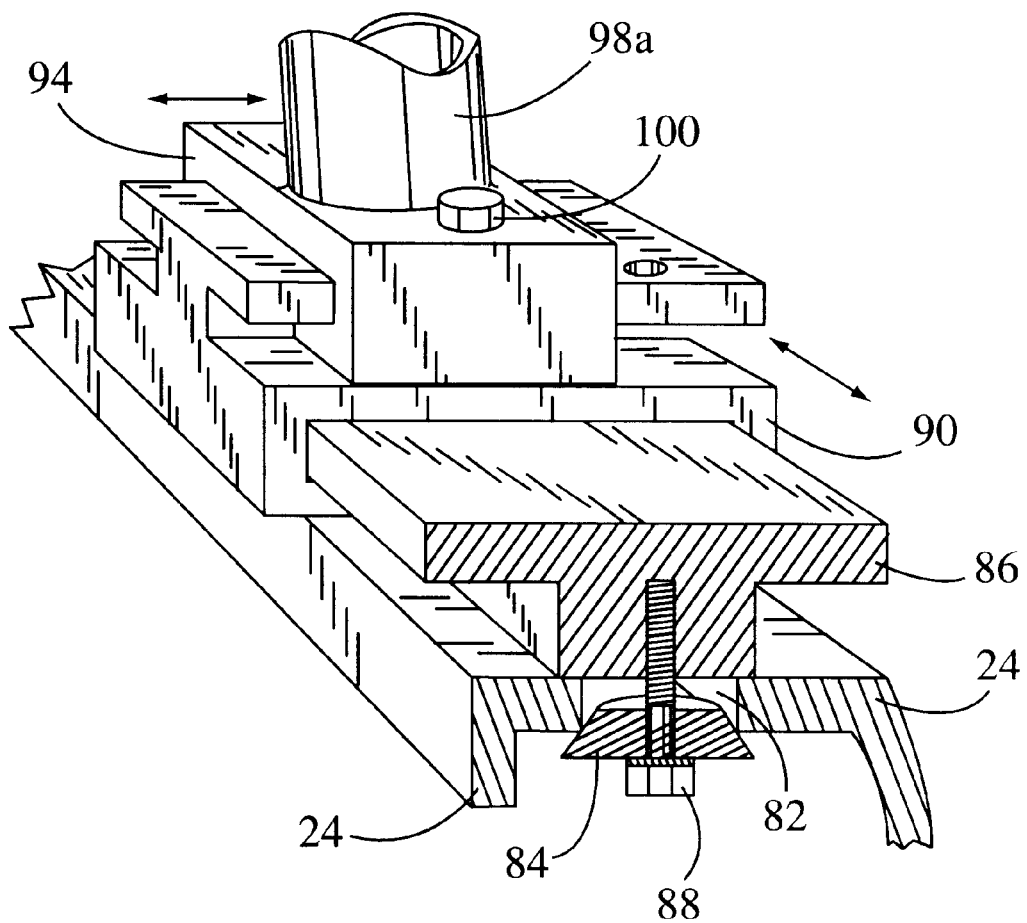
FIG. 7 is a partial top perspective view of the track, bracket and support frame members of the truck shell assembly shown in FIGS. 4–6.
Figure 8:
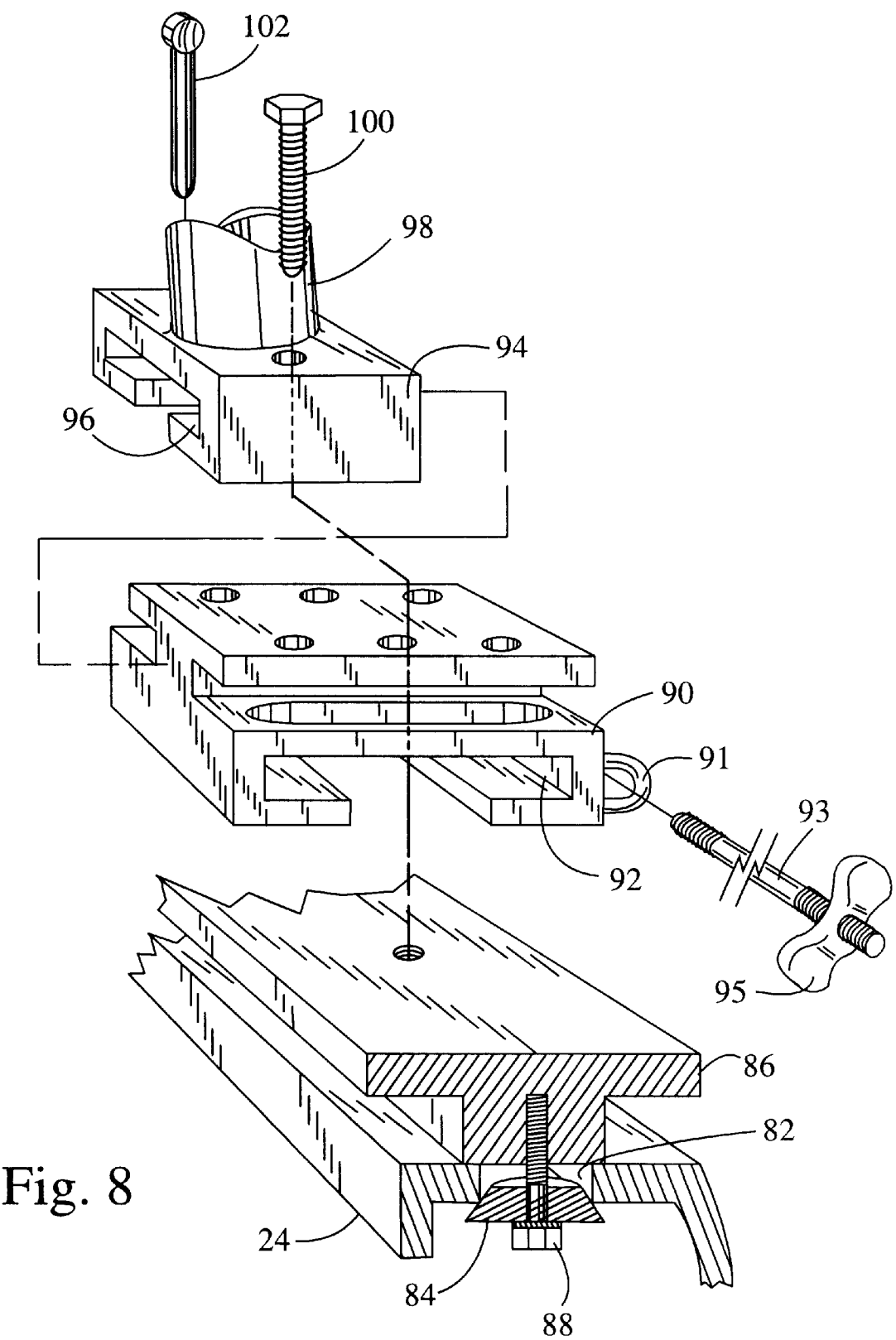
FIG. 8 is an exploded view of the track, bracket and support frame members shown in FIG. 7.

As with the embodiment shown in FIGS. 1–3, the embodiment shown in FIGS. 4–10 includes a left bed wall 18 with a top surface or left rail 24 that extends longitudinally along the length of the truck bed 14. As shown in FIG. 6, there are apertures 82 spaced along the left rail 24. A T-shaped rail 86 (shown in FIGS. 7 and 8) is attached to left rail 24 by inserting a threaded fastener 88 through a frustroconical shaped washer 84 which fits into the aperture 82. A first carriage 90 with a generally T-shaped channel 92 rides along T-shaped rail 86. The T-shaped first carriage 90 allows a post (i.e., frame member) carriage 94 with a generally T-shaped channel 96 to ride along the first carriage 90. A post 98a is attached to post carriage 94. As shown in FIG. 8, post 98a may be integrally formed on post carriage 94. Post carriage 94 is secured to first carriage 90. In exemplary embodiments of the invention, post carriage 94 may be secured to first carriage 90 using a threaded fastener 100, such as a bolt or wing nut. Alternatively, other fastening devices such as a pin 102 may be used to secure post carriage 94 to first carriage 90. In exemplary embodiments, only the first frame member 98a and last frame member 98e need to be secured using fastener 100. Interior frame members 98b, 98c and 98d may be fastened using a threaded fastener or pin, but do not require such fastening. In exemplary embodiments, only one fastening device (e.g., wing nut or pin) is required per bracket assembly. However, it will be appreciated that more than one fastening device can be used on a bracket, if desired.

The first carriage 90 allows the posts (i.e., frame members 98a–98e) to slide to various positions along the length of truck bed 14. The second carriage or post carriage 94 allows the post to slide horizontally with respect to the truck bed 14. Thus, the embodiment shown in FIGS. 4–10 can be adjusted to accommodate trucks whose left wall and right wall are not parallel. In exemplary embodiments, frame members 98a, 98b, 98c, 98d and 98e are extendible at one or more locations 99 along the width of the frame member. FIG. 9 illustrates an exemplary embodiment of a horizontally extendible frame member.

FIG. 6 depicts the frame members 98a–98e in a collapsed position without covering 46 for clarity. However, it is possible to collapse frame members 98a–98e with the covering 46 attached to each frame member 98a–98e such that the covering 46 drapes over the frame members.

In exemplary embodiments, an eyelet 91 is attached to first carriage 90 as shown in FIG. 8. A threaded rod 93 can be inserted through eyelets 91 attached to frame members 98a, 98b, 98c, 98d and 98e. A fastener 95, such as a wing nut, can be secured on each end of the threaded rod. The collapsible truck shell assembly can then be removed and stored as a single unit.

Figure 10:
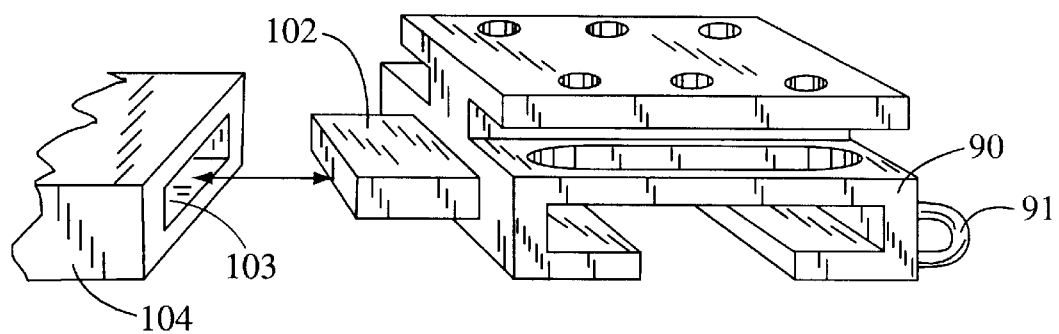
FIG. 10 is a partial top perspective view of the track and bracket shown in FIG. 7 illustrating a stabilizer bar which can be attached to the bracket.

In exemplary embodiments, a stabilizer bar 104, such as that shown in FIG. 10, is attached to first carriage 90 via an attachment tab 102 on the end frame members 98a and 98e. Stabilizer bar 104 includes a channel 103 for accepting attachment tab holder 102. Covering 46 can be secured to the stabilizer bars 104.

Figure 12:
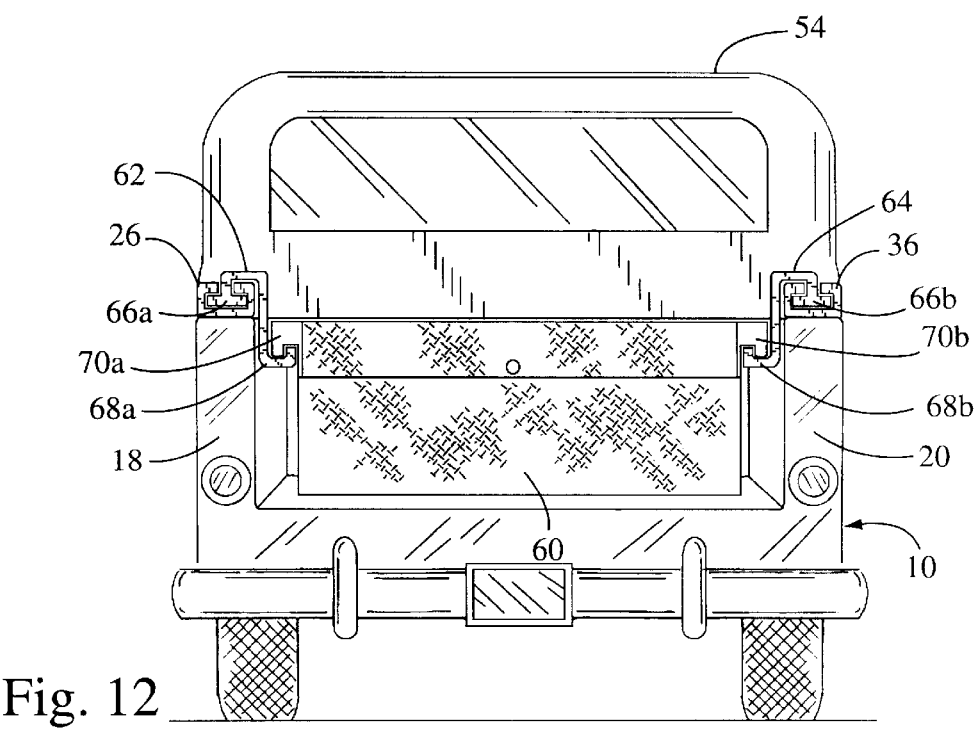
FIG. 12 is a rear elevational view of the storage box shown in FIG. 9.

In accordance with a third embodiment of the present invention, other accessories are attachable to the tracks 26 and 36. FIG. 11 perspectively illustrates a storage box 60 that is insertable into the truck bed 16 on rails 26 and 36 and spans the distance between the left bed wall 18 and the right bed wall 20. The storage box 60 has a lockable compartment 61 for storing tools and supplies, as well as a left "S" bracket 62 and a right "S" bracket 64. Both the left and right "S" brackets have an upper T-shaped portion 66a, 66b that is insertable into the channel 28 of tracks 26 and 36. The T-shaped portion 66a, 66b may include bearings or wheels to facilitate sliding of the each "S" bracket 62, 64 along the length of respective tracks 26 and 36. The T-shaped portion 66a, 66b further includes apertures (not shown) that are alignable with the series of apertures 30 formed on tracks 26 and 36. Therefore, a U-shaped pin 34 may be used to secure a respective "S" bracket along the length of the each track 26 and 36. Additionally, as seen in FIG. 12, each "S" bracket 62, 64 includes a respective lower flange portion 68a, 68b that is cooperatively engageable to a complementary "L" bracket 70a and 70b disposed on each side of compartment 61. Therefore, each "L" bracket 70a, 70b is supported by a respective flange portion 68a, 68b of "S" brackets 62, 64. The compartment 61 is supported slightly above the bed floor 16 by "S" brackets 62, 64 such that the compartment 61 can be slid toward the rear of truck bed 14 for either accessing the interior or removing compartment 61 from the truck bed 14. As will be recognized, the storage box 60 can be attached to the tracks 26, 36 when the truck shell 12 is either in a collapsed position or removed from truck bed 14. While the third embodiment of the present invention is shown using the brackets of the first embodiment of the invention, it will be appreciated that other embodiments, such as the second embodiment, can be used to hold a storage box such as that shown in FIG. 11.

Figure 13:
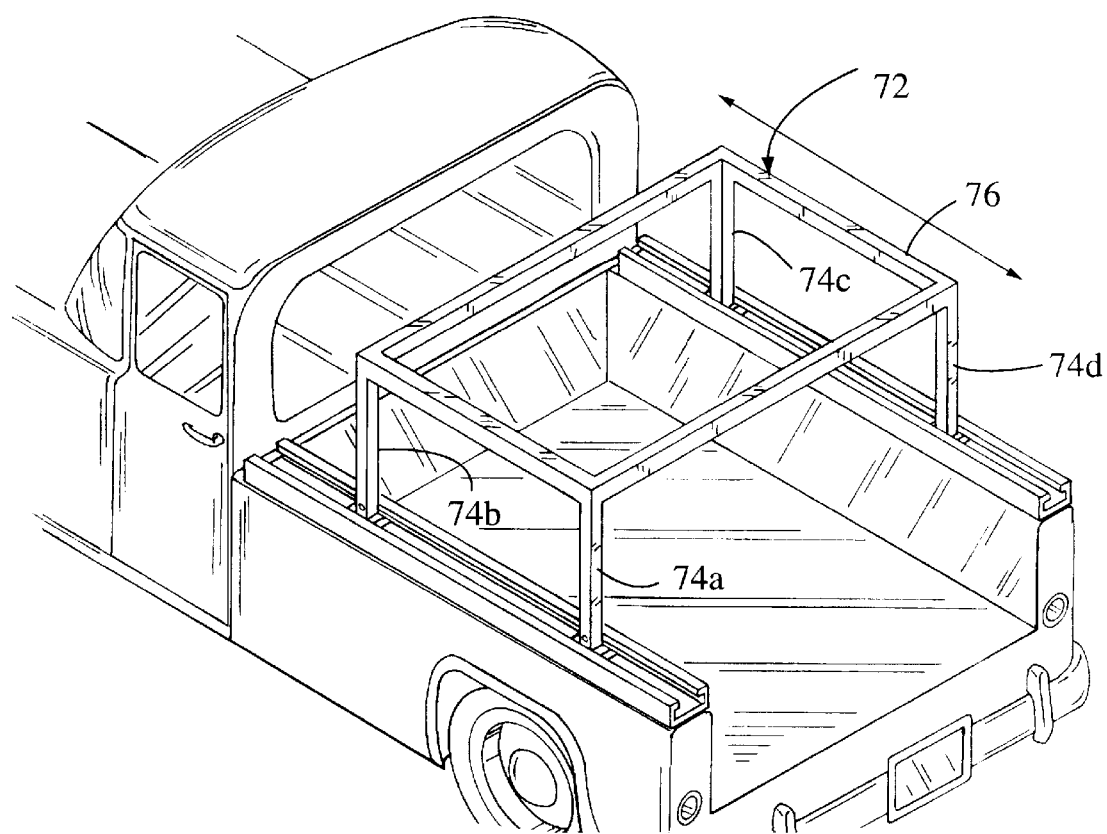
FIG. 13 is a top perspective view of a fourth embodiment of the present invention illustrating a storage rack which is mounted to the truck through the use of the tracks of the truck shell assembly of the first embodiment.

In accordance with a fourth embodiment of the present invention, the tracks 26 and 36 can additionally support a storage rack 72. As seen in FIG. 13, the storage rack 72 is a generally rectangular shaped structure that can be used to secure objects such as pipes, ladders, and tools thereon. The storage rack 72 comprises four vertical members 74a–74d having top ends that support the corners of a generally square top member 76. As will be recognized, the square top member 76 can be sized according to the size of the bed 14 and the objects to be secured thereon. The bottom ends of each vertical member 74a–74d may be attached to respective ones of the brackets 32 as previously described above. Specifically, the bottom ends of each vertical member 74a–74d are advancable over the post 42 of a respective bracket 32 and secured with a bolt or pin. Therefore, the storage rack 72 is slidable along the length of the truck bed 14 and can be secured in place with U-shaped pins 34. Alternatively, the bottom ends of the storage rack 72 may comprise T-shaped brackets that are sized to be insertable into the channel 28 of the left 26 and right 36 tracks. The storage rack 72 would then be slidably inserted into the tracks 26 and 36 and maintained in place with U-shaped pins 34. The storage rack 72 can be attached to the truck bed 14 when the truck shell 12 is collapsed or removed. Additionally, it is possible to attach the storage rack 72 to the truck bed 14 when the storage box 60 is also attached. While the tracks shown in FIG. 14 are the same tracks used with the first embodiment of the invention, it will be appreciated that other tracks, such as those of the second embodiment of the invention, can be used with the storage rack shown in FIG. 13.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A collapsible truck shell assembly for use with a truck bed having a first bed wall and a second bed wall, the shell assembly being movable between a collapsed position and an extended position, the collapsible truck shell assembly comprising:

an elongate first track mounted to the first bed wall;

an elongate second track mounted to the second bed wall;

a plurality of generally U-shaped frame members slidably engagable to and extensible between the first track and the second track; and a collapsible covering attachable to and extensible between the frame members, the covering being sized to substantially enclose the truck bed when the shell assembly is in the extended position.

2. The truck shell assembly of claim 1, wherein the frame members are of progressively decreasing sizes so as to be nestable within each other in a manner assuming a generally planar configuration when the truck shell assembly is in the collapsed position.

3. The truck shell assembly of claim 2, wherein each frame member comprises a horizontal top portion, a first and second vertical side portion, and a first and second bottom end, the horizontal top portion and the first and second side portions being sized slightly smaller than a preceding frame member such that the frame member is nestable within the preceding larger frame member.

4. The truck shell assembly of claim 3, wherein the first and second side portions of each frame member are bent so as to be nestable within the preceding larger frame member.

5. The truck shell assembly of claim 1, further comprising a plurality of brackets, each bracket being attachable to a respective bottom end of a frame member and configured to be slidably engageable to a respective one of the first and second tracks.

6. The truck shell assembly of claim 5, wherein the plurality of brackets provide for the frame members to be horizontally adjusted with respect to the first bed wall and the second bed wall.

7. The truck shell assembly of claim 1, wherein the first track and the second track have a plurality of pairs of coaxially aligned apertures extending therethrough and the truck shell assembly further comprises a locking pin extensible through at least one pair of the coaxially aligned apertures and configured to lock the frame members in place.

8. The truck shell assembly of claim 1, wherein the truck bed has a front end and the shell assembly is configured such that the frame members are positioned at the front of the bed when shell assembly is in the collapsed position.

* * * * *